(12) United States Patent
Brudner et al.

(10) Patent No.: US 11,626,018 B2
(45) Date of Patent: Apr. 11, 2023

(54) PARKING MANAGEMENT AND COMMUNICATION OF PARKING INFORMATION

(71) Applicant: Ford Global Technologies, LLC, Dearborn, MI (US)

(72) Inventors: Alexander Brudner, Dearborn, MI (US); Addarsh Chandrasekar, Dearborn, MI (US); Aysha Habbaba, Dearborn, MI (US); William Donald Hass, Dearborn, MI (US); Tatiana Ferreyra, Dearborn, MI (US); Yuzhou Li, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 443 days.

(21) Appl. No.: 16/482,744

(22) PCT Filed: Feb. 1, 2017

(86) PCT No.: PCT/US2017/016032
§ 371 (c)(1),
(2) Date: Aug. 1, 2019

(87) PCT Pub. No.: WO2018/143982
PCT Pub. Date: Aug. 9, 2018

(65) Prior Publication Data
US 2020/0242933 A1  Jul. 30, 2020

(51) Int. Cl.
*G08G 1/14* (2006.01)
*G06F 21/62* (2013.01)
*H04W 12/06* (2021.01)
*H04W 12/037* (2021.01)

(52) U.S. Cl.
CPC ......... *G08G 1/141* (2013.01); *G06F 21/6218* (2013.01); *G08G 1/148* (2013.01); *H04W 12/037* (2021.01); *H04W 12/06* (2013.01)

(58) Field of Classification Search
None
See application file for complete search history.

(56) References Cited

U.S. PATENT DOCUMENTS

2005/0280555 A1* 12/2005 Warner, IV ............ G08G 1/14
  705/13
2014/0282470 A1* 9/2014 Buga ..................... G06F 8/65
  717/170

(Continued)

OTHER PUBLICATIONS

Chinese Office Action for CN Application No. 201780088238.6 dated Jul. 27, 2022 (13 pages, with English translation).

*Primary Examiner* — Brandon Hoffman
(74) *Attorney, Agent, or Firm* — Brandon Hicks; Eversheds Sutherland (US) LLP (57) ABSTRACT

Techniques and examples pertaining to parking management and communication of parking information are described. A processor of a computing apparatus may obtain sensor data regarding a parking lot from a parking lot controller. The processor may analyze the sensor data. The processor may receive, from a client, a request for assistance with parking at the parking lot. The processor may provide, to the client, information on a location and status of a space (e.g., open space) in the parking lot, a path to the space, or both.

18 Claims, 4 Drawing Sheets

(56) References Cited

U.S. PATENT DOCUMENTS

| | | | | |
|---|---|---|---|---|
| 2014/0350855 A1* | 11/2014 | Vishnuvajhala | ....... | G08G 1/144 |
| | | | | 701/538 |
| 2015/0142533 A1* | 5/2015 | Shalev | ................. | G06Q 20/145 |
| | | | | 705/13 |
| 2015/0356498 A1* | 12/2015 | Casanova | .............. | G07B 15/02 |
| | | | | 705/13 |
| 2015/0373482 A1* | 12/2015 | Barnard | ................. | H05B 47/11 |
| | | | | 370/338 |
| 2016/0358108 A1* | 12/2016 | Sadovsky | .............. | G06Q 10/02 |

* cited by examiner

PARKING MANAGEMENT AND COMMUNICATION OF PARKING INFORMATION

TECHNICAL FIELD

The present disclosure generally relates to parking management and, more particularly, to parking management and communication of parking information.

BACKGROUND

With ever-increasing vehicle ownership and number of vehicles in use, parking has been an issue for many vehicle drivers. Existing parking lot systems cater to large numbers of vehicles moving in and out at different times of the day. As the number of vehicles continues to increase, parking lot systems may be subject to a surge in usage. Despite the rising usage of parking lots, however, there is currently no adequate parking management system to efficiently manage parking lots. Parking systems at present time are either managed by human operators or not managed at all.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Figure 1:
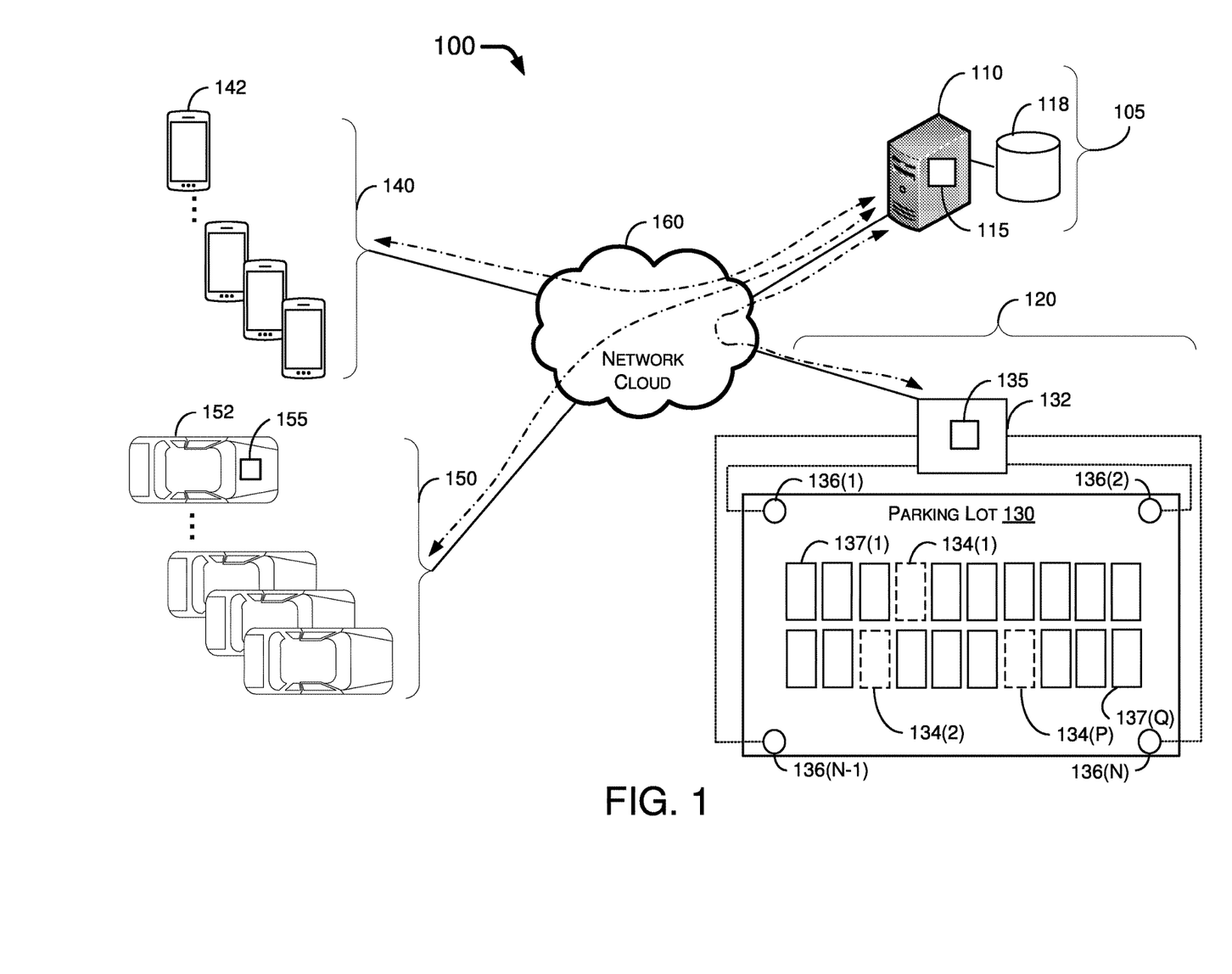
FIG. 1 is a diagram depicting an example scenario in which embodiments in accordance with the present disclosure may be utilized.

FIG. 1 illustrates an example scenario 100 in which embodiments in accordance with the present disclosure may be utilized. To address the aforementioned issue with inadequate parking management, the present disclosure proposes techniques, schemes, processes and apparatus pertaining to efficient parking management and communication of parking information. Under a proposed scheme, scenario 100 involves a cloud-based management system 105 (also referred to as a parking lot management system), a smart parking lot system 120, a user interface system 140 and an autonomous vehicle interface system 150.

The cloud-based management system 105 may include a number of central processing units or servers (represented by a computing apparatus 110 in FIG. 1) and a database 118 accessible by computing apparatus 110. Computing apparatus 110 may include a processor 115, which controls operations of the cloud-based management system 105. The cloud-based management system 105 may communicate with the smart parking lot system 120 via a network cloud 160 to obtain parking lot-related information and store such information in database 118. The cloud-based management system 105 may relay the parking lot-related information to the user interface system 140 and the autonomous vehicle interface system 150 upon request.

The smart parking lot system 120 may include one or more parking lots (represented by a parking lot 130 in FIG. 1) each associated with and managed by a respective parking lot controller 132, which may include a processor 135 that controls operations of the smart parking lot system 120. Parking lot 130 may include a number of parking spaces, each of which may be either occupied (referred as "occupied space") or unoccupied (referred as "open space"). In the example shown in FIG. 1, parking lot 130 has one or more open spaces 134(1)-134(P) as well as one or more occupied spaces 137(1)-137(Q). Parking lot 130 may also include one or more sensors 136(1)-136(N) that are capable of sensing one or more aspects of parking lot 130 to provide sensor data representative of parking lot-related information. For instance, the sensor data may indicate the existence, number and/or location(s) of the one or more open spaces 134(1)-134(P). The one or more sensors 136(1)-136(N) may include, for example and without limitation, one or more Light Detection and Ranging (LIDAR) detectors, one or more infrared cameras, one or more visible light cameras, and/or one or more Global Positioning System (GPS) sensors. Processor 135 may collect the sensor data from the one or more sensors 136(1)-136(N). For instance, the one or more sensors 136(1)-136(N) may be capable of transmitting the sensor data continuously or periodically to processor 135 in a wired or wireless manner (e.g., via cables or via Wi-Fi). Processor 135 may provide the sensor data, representative of parking lot-related information, to processor 115 of the cloud-based management system 105 via network cloud 160 using an encrypted communication channel (e.g., virtual private network (VPN) or any suitable technology).

The user interface system 140 may include a number of user interface devices and/or applications (including a user interface device 142 shown in FIG. 1) for human users to request for parking lot-related information from the cloud-based management system 105. The interface devices and/or applications of the user interface system 140 may take many forms including, for example and without limitation, mobile application(s), built-in touchscreen(s) embedded in GPS devices and/or vehicle user interface(s)/control console(s). In some embodiments, each user of the use interface system 140 may need to first obtain permission from the cloud-based management system 105 in order for the cloud-based management system 105 to provide the requested parking lot-related information.

The autonomous vehicle interface system 150 may include a number of autonomous vehicles (including an autonomous vehicle 152 shown in FIG. 1, which includes a processor 155 that controls various operations of autonomous vehicle 152) each of which capable of requesting for parking lot-related information from the cloud-based management system 105. In some embodiments, the parking lot-related information provided by the cloud-based management system 105 to autonomous vehicles of the autonomous vehicle interface system 150 may be disseminated or otherwise provided in a format that is readable by that autonomous vehicle that requests the parking lot-related information. In some embodiments, each autonomous vehicle of the autonomous vehicle interface system 150 may need to first obtain permission from the cloud-based management system 105 in order for the cloud-based management system 105 to provide the requested parking lot-related information. Upon receiving the parking lot-related information, the autonomous vehicle may determine an optimal place for parking (e.g., a nearest parking lot with unoccupied spaces).

Thus, the cloud-based management system 105 may act as an interface between the smart parking lot system 120 and each of the user interface system 140 and the autonomous vehicle interface system 150. Accordingly, computing apparatus 110 may utilize database 118 to relay data on parking lot-related information from one system to another. Based on the sensor data, processor 115 may perform data analytics on the overall management of parking lots by the smart parking lot system 120, and may provide a recommendation to parking lot controller 132 to improve the management of parking lots (e.g., parking lot 130). Processor 115 may authenticate each request from a user (e.g., user interface device 142) of the user interface system 140 and each request from an autonomous vehicle (e.g., autonomous vehicle 152) of the autonomous vehicle interface system 150. Upon obtaining permission, the requesting entity may utilize a public application programming interface (API) to access the requested information.

Figure 2:
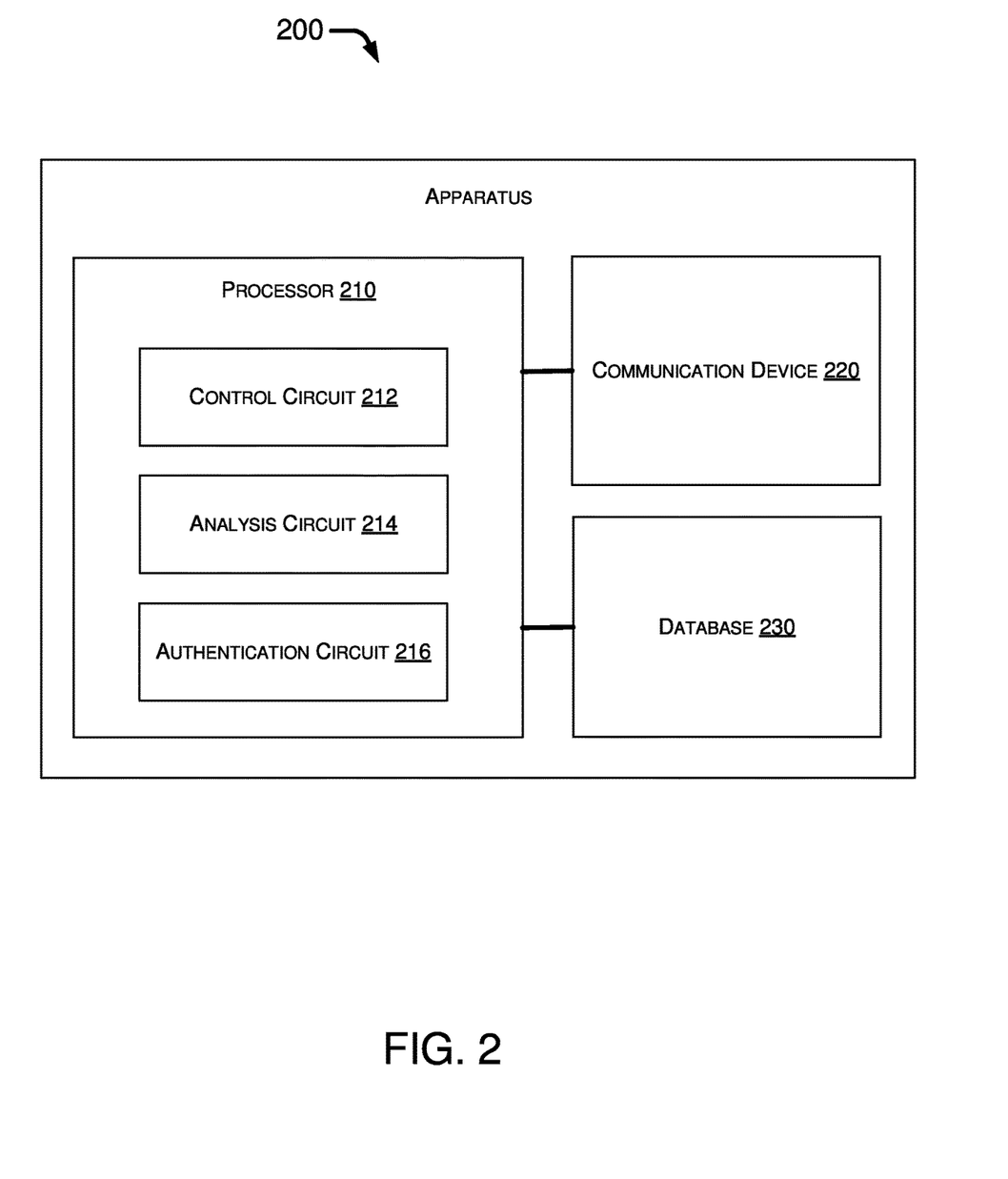
FIG. 2 is a block diagram depicting an example apparatus in accordance with an embodiment of the present disclosure.

FIG. 2 illustrates an example apparatus 200 in accordance with an embodiment of the present disclosure. Apparatus 200 may perform various functions related to techniques, schemes, methods and systems described herein pertaining to parking management and communication of parking information, including those described above with respect to scenario 100 as well as those described below with respect to process 300 and process 400. Apparatus 200 may be implemented as computing apparatus 110 in scenario 100 to effect various embodiments in accordance with the present disclosure. Apparatus 200 may include one, some or all of the components shown in FIG. 2. Apparatus 200 may also include one or more other components not be pertinent to various embodiments of the present disclosure and, thus, such component(s) is/are not shown in FIG. 2 and a description thereof is not provided herein in the interest of brevity.

Apparatus 200 may include at least a processor 210, which may include a control circuit 212, an analysis circuit 214 and an authentication circuit 216. Processor 210 may be an example implementation of processor 115 of computing apparatus 110. Processor 210 may be implemented in the form of one or more single-core processors, one or more multi-core processors, or one or more complex instruction set computing (CISC) processors. Thus, even though a singular term "a processor" is used herein to refer to processor 210, processor 210 may include multiple processors in some embodiments and a single processor in other embodiments in accordance with the present disclosure. In another aspect, processor 210 may be implemented in the form of hardware (and, optionally, firmware) with electronic components including, for example and without limitation, one or more transistors, one or more diodes, one or more capacitors, one or more resistors and/or one or more inductors that are configured and arranged to achieve specific purposes in accordance with the present disclosure. In other words, in at least some embodiments, processor 210 is a special-purpose machine specifically designed, arranged and configured to perform specific tasks including parking management and communication of parking information in accordance with various embodiments of the present disclosure.

In some embodiments, apparatus 200 may include a communication device 220 communicatively coupled to processor 210. Communication device 220 may be capable of establishing wireless communications with one or more networks (e.g., network 160) and/or one or more parking lot controllers (e.g., parking lot controller 132). In some embodiments, apparatus 200 may include a database 230 communicatively coupled to processor 210. Database 230 may be capable of storing data.

Control circuit 212 may be capable of obtaining, via the communication device 220, sensor data regarding a parking lot (e.g., parking lot 130) from a parking lot controller (e.g., parking lot controller 132). Analysis circuit 214 may be capable of analyzing the sensor data. Control circuit 212 may be also capable of receiving, from a client (e.g., user interface device 142 or autonomous vehicle 152), a request for assistance with parking at the parking lot. Control circuit 212 may be further capable of providing, to the client, information on a location and status of a space (e.g., any open space) in the parking lot, a path to the space, or both.

In some embodiments, control circuit 212 may be also capable of establishing, via the communication device 220, an encrypted communication channel with the parking lot controller. In some embodiments, in obtaining the sensor data, control circuit 212 may be capable of receiving, via the communication device 220, the sensor data from the parking lot controller in real-time or periodically via the encrypted communication channel.

In some embodiments, in receiving the request from the client, control circuit 212 may be capable of receiving the request from an autonomous vehicle or a user device operated by a human user.

In some embodiments, in providing the information, processor 210 may be capable of performing a number of operations. For instance, authentication circuit 216 may be capable of authenticating the request from the client. Moreover, authentication circuit 216 may also be capable of granting the client permission to access the information upon a positive result of authentication. Conversely, upon a negative result of the authentication, authentication circuit 216 may be capable of denying the client permission to access the information.

In some embodiments, in providing the information, control circuit 212 may be capable of providing the information to the client in a format readable by an autonomous vehicle.

In some embodiments, the sensor data may include data collected by one or more sensors (e.g., one or more sensors 136(1)-136(N)) associated with the parking lot. The sensor data may indicate one or more locations of one or more spaces (e.g., open/unoccupied spaces as well as occupied spaces) in the parking lot.

In some embodiments, control circuit 212 may be capable of storing the sensor data in database 230. Moreover, analysis circuit 214 may be capable of performing data analytics on a parking lot management system (e.g., parking lot management system 105) using the sensor data. Additionally, control circuit 212 may be capable of providing, via the communication device 220 to the parking lot controller, a recommendation based on a result of the data analytics. For instance, control circuit 212 may provide a recommendation on one or more ways to lower inefficiency and/or improve revenue.

Figure 3:
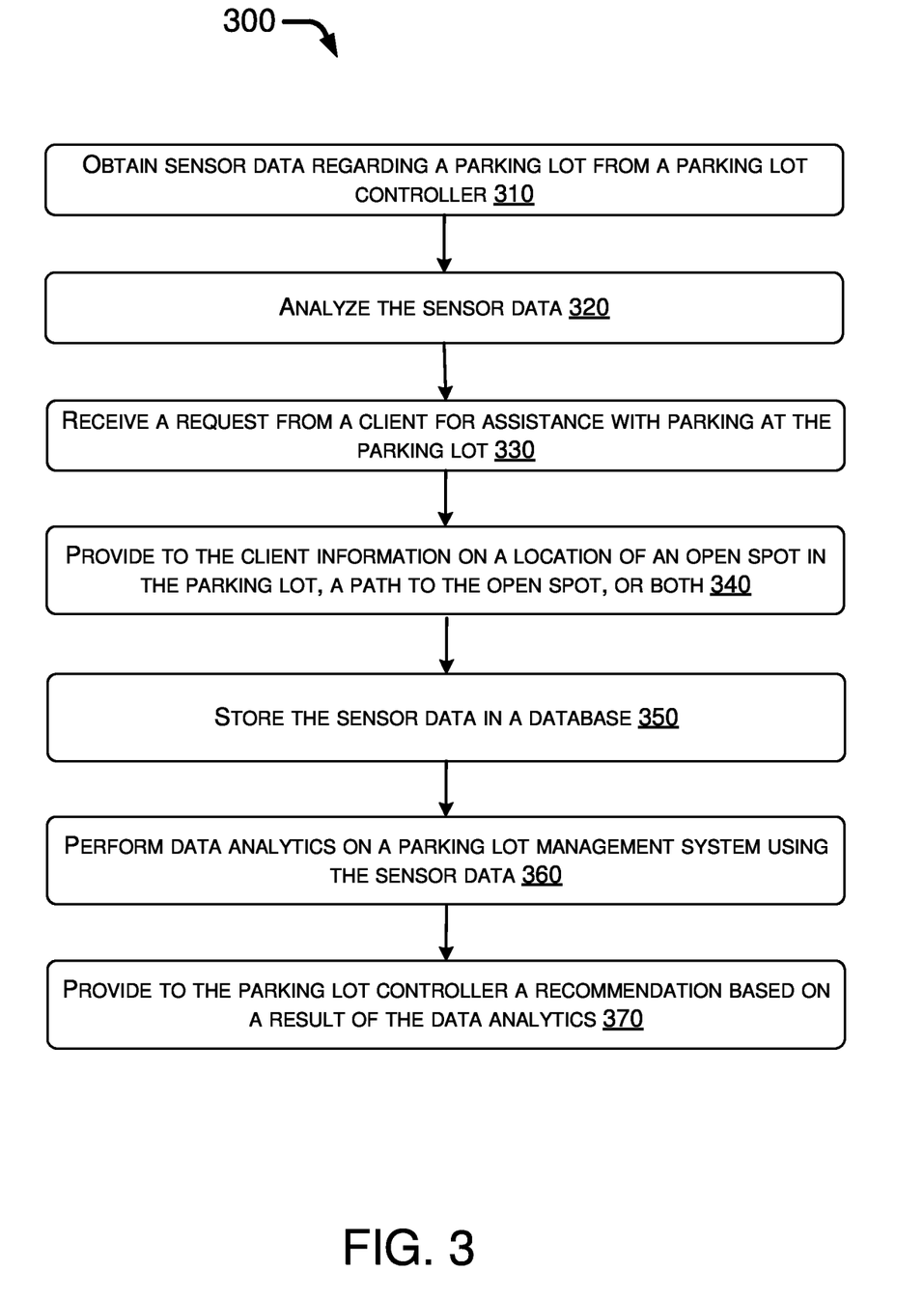
FIG. 3 is a flowchart depicting an example process in accordance with an embodiment of the present disclosure.

FIG. 3 illustrates an example process 300 in accordance with an embodiment of the present disclosure. Process 300 may include one or more operations, actions, or functions shown as blocks such as 310, 320, 330, 340, 350, 360 and 370. Although illustrated as discrete blocks, various blocks of process 300 may be divided into additional blocks, combined into fewer blocks, or eliminated, depending on the desired implementation. Moreover, process 300 may be executed in orders different than that shown in FIG. 3. Process 300 may be implemented in scenario 100 and/or by apparatus 200. For illustrative purposes and without limitation, the following description of process 300 is provided in the context of scenario 100. Process 300 may begin with block 310.

At 310, process 300 may involve processor 115 of computing apparatus 110 obtaining sensor data regarding a parking lot 130 from a parking lot controller 132. For example, processor 115 may periodically request processor 135 of parking lot controller 132 to provide the sensor data. Alternatively or additionally, processor 135 of parking lot controller 132 may be scheduled to periodically provide the sensor data to processor 115. Process 300 may proceed from 310 to 320.

At 320, process 300 may involve processor 115 analyzing the sensor data. Process 300 may proceed from 320 to 330.

At 330, process 300 may involve processor 115 receiving, from a client (e.g., user interface device 142 or autonomous vehicle 152), a request for assistance with parking at parking lot 130. Process 300 may proceed from 330 to 340.

At 340, process 300 may involve processor 115 providing, to the client, information on a location of a space (e.g., any of one or more open slots 134(1)-134(P)) in parking lot 130, a path to the space, or both. Process 300 may proceed from 340 to 350.

At 350, process 300 may involve processor 115 storing the sensor data in database 118. Process 300 may proceed from 350 to 360.

At 360, process 300 may involve processor 115 performing data analytics on parking lot management system 120 using the sensor data. Process 300 may proceed from 360 to 370.

At 370, process 300 may involve processor 115 providing, to parking lot controller 125, a recommendation based on a result of the data analytics. For instance, processor 115 may provide a recommendation on one or more ways to lower inefficiency and/or improve revenue.

In some embodiments, process 300 may also involve processor 115 establishing an encrypted communication channel with parking lot controller 132. In some embodiments, in obtaining the sensor data, process 300 may involve processor 115 receiving the sensor data from the parking lot controller 132 in real-time or periodically via an encrypted communication channel.

In some embodiments, in receiving the request from the client, process 300 may also involve processor 115 receiving the request from an autonomous vehicle or a user device operated by a human user.

In some embodiments, in providing the information, process 300 may involve processor 115 authenticating the request from the client. Moreover, process 300 may involve processor 115 granting permission to the client to access the information upon a positive result of the authenticating.

In some embodiments, in providing the information, process 300 may involve processor 115 providing the information to the client in a format readable by an autonomous vehicles.

In some embodiments, the sensor data may include data collected by one or more sensors 136(1)-136(N) associated with parking lot 130. The sensor data may indicate one or more locations of one or more spaces (e.g., open spaces 134(1)-134(P)) in parking lot 130.

Figure 4:
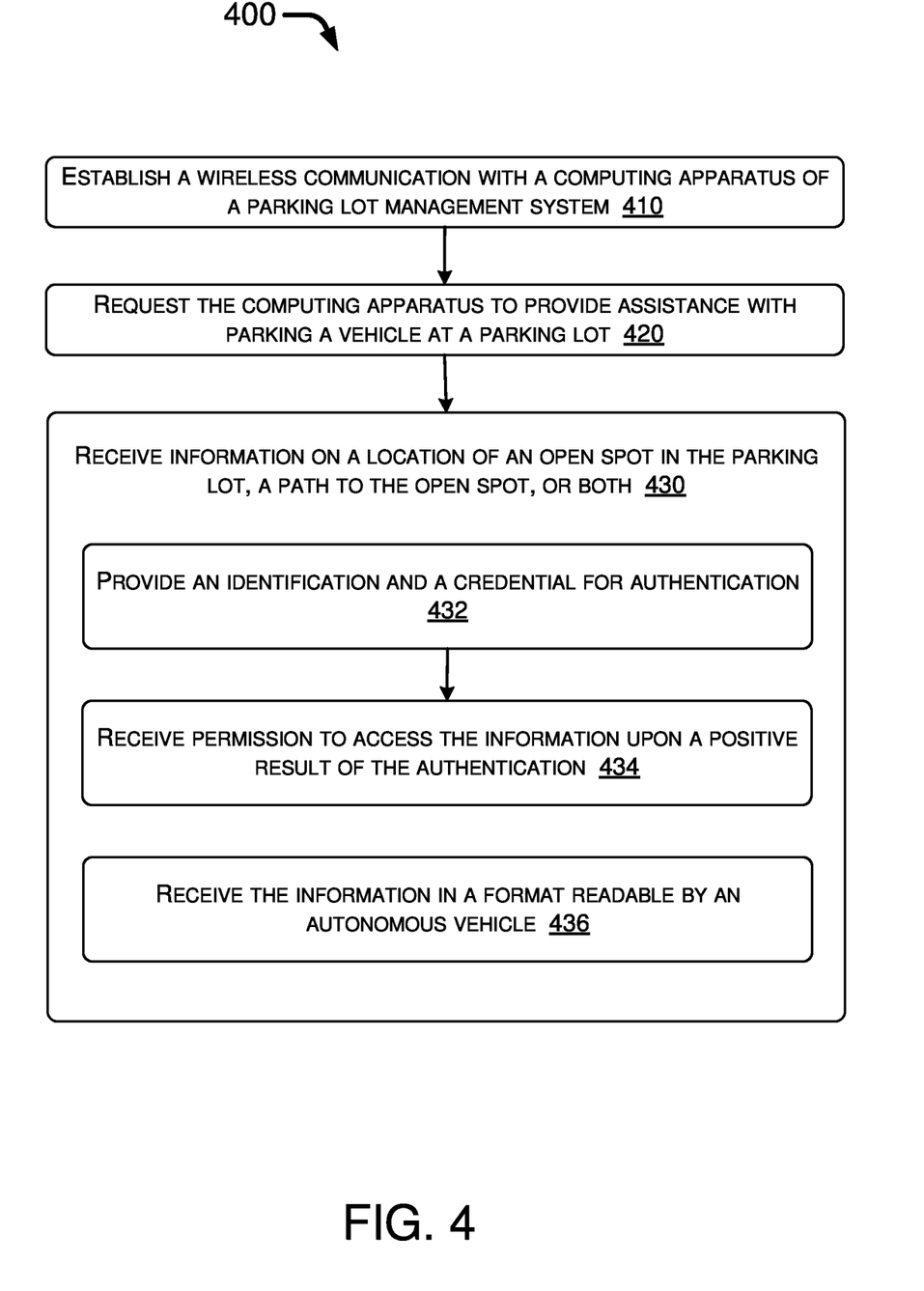
FIG. 4 is a flowchart depicting an example process in accordance with an embodiment of the present disclosure.

FIG. 4 illustrates an example process 400 in accordance with an embodiment of the present disclosure. Process 400 may include one or more operations, actions, or functions shown as blocks such as 410, 420 and 430 as well as sub-blocks 432, 434 and 436. Although illustrated as discrete blocks, various blocks of process 400 may be divided into additional blocks, combined into fewer blocks, or eliminated, depending on the desired implementation. Moreover, process 400 may be executed in orders different than that shown in FIG. 4. Process 400 may be implemented in scenario 100 and/or by apparatus 200. For illustrative purposes and without limitation, the following description of process 400 is provided in the context of scenario 100. Process 400 may begin with block 410.

At 410, process 400 may involve processor 155 of a control system of vehicle 152 establishing a wireless communication with processor 115 of computing apparatus 110 of parking lot management system 105. Process 400 may proceed from 410 to 420.

At 420, process 400 may involve processor 155 requesting processor 115 of computing apparatus 110 to provide assistance with parking vehicle 152 at parking lot 130. Process 400 may proceed from 410 to 420.

At 430, process 400 may involve processor 155 receiving information on a location of a space (e.g., any of one or more open spaces 134(1)-134(P)) in parking lot 130, a path to the space, or both, from processor 115 of computing apparatus 110. In receiving the information, process 400 may involve processor 155 performing a number of operations, as represented by sub-blocks 432, 434 and 436.

At 432, process 400 may involve processor 155 providing an identification and a credential of vehicle 152 to processor 115 of computing apparatus 110 for authentication. Process 400 may proceed from 432 to 434.

At 434, process 400 may involve processor 155 receiving, from processor 115, permission to access the information upon a positive result of the authentication.

At 436, process 400 may involve processor 155 receiving the information in a format readable by an autonomous vehicle such as vehicle 152.

In some embodiments, in establishing the wireless communication with processor 115 of computing apparatus 110, process 400 may involve processor 155 establishing an encrypted communication channel to communicate with processor 115 of computing apparatus 110.

In the above disclosure, reference has been made to the accompanying drawings, which form a part hereof, and in which is shown by way of illustration specific implementations in which the present disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

The invention claimed is:

1. A method, comprising:
obtaining, by a processor of a computing apparatus, sensor data regarding a parking lot from a parking lot controller, wherein the sensor data is collected by one or more sensors associated with the parking lot and indicates a total number of spaces in the parking lot, an existence of one or more unoccupied spaces and/or occupied spaces in the parking lot, a global location of the one or more unoccupied spaces and/or occupied spaces in the parking lot, and a relative location of the one or more unoccupied spaces and/or occupied spaces in the parking lot with respect to one another;

analyzing, by the processor, the sensor data;

receiving, by the processor and from a vehicle, a request for assistance with parking at the parking lot;

providing, by the processor and to the vehicle, information on the existence, the global location, and the relative location of the one or more unoccupied spaces and/or occupied spaces in the parking lot, one or more optimal paths to the one or more unoccupied spaces and/or occupied spaces, or both;

performing, by the processor, data analytics on a parking lot management system using the sensor data, wherein the data analytics are based on the existence, the global location, and the relative location of the one or more unoccupied spaces and/or occupied spaces in the parking lot at one or more times, the one or more optimal paths to the one or more unoccupied and/or occupied spaces at the one or more times, or both; and providing, by the processor to the parking lot controller, a recommendation associated with efficiency and revenue of the parking lot based on a result of the data analytics.

2. The method of claim 1, wherein the obtaining of the sensor data comprises receiving the sensor data from the parking lot controller in real-time or periodically via an encrypted communication channel.

3. The method of claim 2, further comprising:

establishing, by the processor, the encrypted communication channel with the parking lot controller prior to the receiving of the sensor data from the parking lot controller.

4. The method of claim 1, wherein the receiving of the request from the vehicle comprises receiving the request from an autonomous vehicle or a user device operated by a human user.

5. The method of claim 1, wherein the providing of the information comprises:

authenticating the request from the vehicle; and granting permission to the vehicle to access the information upon a positive result of the authenticating, wherein the permission is denied upon a negative result of the authenticating.

6. The method of claim 1, wherein the providing of the information comprises providing the information to the vehicle in a format readable by an autonomous vehicle.

7. The method of claim 1, further comprising:

storing, by the processor, the sensor data in a database.

8. A method, comprising:

establishing, by a processor of a control system of a vehicle, a wireless communication with a computing apparatus of a parking lot management system;

requesting, by the processor, the computing apparatus to provide assistance with parking the vehicle at a parking lot;

receiving, by the processor, sensor data regarding the parking lot from the computing apparatus, wherein the sensor data is collected by one or more sensors associated with the parking lot and indicates a total number of spaces in the parking lot, an existence of one or more unoccupied spaces and/or occupied spaces in the parking lot, a global location of the one or more unoccupied spaces and/or occupied spaces in the parking lot, and a relative location of the one or more unoccupied spaces and/or occupied spaces in the parking lot with respect to one another;

performing, by the processor, data analytics on a parking lot management system using the sensor data, wherein the data analytics are based on the existence, the global location, and the relative location of the one or more unoccupied spaces and/or occupied spaces in the parking lot at one or more times, one or more optimal paths to the one or more unoccupied and/or occupied spaces at the one or more times, or both; and providing, by the processor to the parking lot controller, a recommendation associated with efficiency and revenue of the parking lot based on a result of the data analytics.

9. The method of claim 8, wherein the establishing of the wireless communication with the computing apparatus comprises establishing an encrypted communication channel.

10. The method of claim 8, wherein the receiving of the sensor data comprises: providing an identification and a credential for authentication; and receiving permission to access the sensor data upon a positive result of the authentication, wherein the permission is denied upon a negative result of the authenticating.

11. The method of claim 8, wherein the receiving of the sensor data comprises receiving the sensor data in a format readable by an autonomous vehicle.

12. An apparatus, comprising:

a communication device capable of communicating with a parking lot controller;

a database capable of storing data; and a processor capable of controlling the communication device and accessing the database, the processor further capable of performing operations comprising:

obtaining, via the communication device, sensor data regarding a parking lot from the parking lot controller, wherein the sensor data is collected by one or more sensors associated with the parking lot and indicates a total number of spaces in the parking lot, an existence of one or more unoccupied spaces and/or occupied spaces in the parking lot, a global location of the one or more unoccupied spaces and/or occupied spaces in the parking lot, and a relative location of the one or more unoccupied spaces and/or occupied spaces in the parking lot with respect to one another;

analyzing the sensor data;

receiving, from a vehicle, a request for assistance with parking at the parking lot;

providing, to the vehicle, information on the existence, the global location, and the relative location of the one or more unoccupied spaces and/or occupied spaces in the parking lot, one or more optimal paths to the one or more unoccupied spaces and/or occupied spaces, or both;

performing data analytics on a parking lot management system using the sensor data, wherein the data analytics are based on the existence, the global location, and the relative location of the one or more unoccupied spaces and/or occupied spaces in the parking lot at one or more times, the one or more optimal paths to the one or more unoccupied spaces and/or occupied spaces at the one or more times, or both; and providing, via the communication device to the parking lot controller, a recommendation associated with efficiency and revenue of the parking lot based on a result of the data analytics.

13. The apparatus of claim 12, wherein the processor is further capable of establishing, via the communication device, an encrypted communication channel with the parking lot controller.

14. The apparatus of claim 13, wherein, in obtaining the sensor data, the processor is capable of receiving, via the communication device, the sensor data from the parking lot controller in real-time or periodically via the encrypted communication channel.

15. The apparatus of claim 12, wherein, in receiving the request from the vehicle, the processor is capable of receiving the request from an autonomous vehicle or a user device operated by a human user.

16. The apparatus of claim 12, wherein, in providing the information, the processor is capable of performing operations comprising:
   authenticating the request from the vehicle; and
   granting permission to the vehicle to access the information upon a positive result of the authenticating, wherein the permission is denied upon a negative result of the authenticating.

17. The apparatus of claim 12, wherein, in providing the information, the processor is capable of providing the information to the vehicle in a format readable by an autonomous vehicle.

18. The apparatus of claim 12, wherein the processor is further capable of performing operations comprising:
   storing the sensor data in the database.

* * * * *